Oct. 8, 1935.  R. B. TEMPLE  2,016,525

VEHICLE WHEEL

Filed April 30, 1932

INVENTOR:
Robert B. Temple,
BY
John P. Tarbot
ATTORNEY

Patented Oct. 8, 1935

2,016,525

UNITED STATES PATENT OFFICE 2,016,525

VEHICLE WHEEL

Robert B. Temple, Detroit, Mich., assignor to Budd Wheel Company, Philadelphia, Pa., a corporation of Pennsylvania Application April 30, 1932, Serial No. 608,349

8 Claims. (Cl. 301—6)

The invention relates to wheels, and more particularly to light gauge sheet metal wheels suitable for use on airplanes or automobiles. The principal object of the invention is the provision of a sheet metal wheel susceptible of modification and re-designing for various ultimate uses. A further object relates to the provision of a very light weight wheel possessing strength to a degree consistent with the requirements of modern vehicle weights and speeds.

Other objects relate to refinements of detail, such as the provision of a brake drum within the wheel, and a relatively simple rim construction.

These and other objects I have attained by the provision of an integral wheel body and rim, fabricated from light gauge sheet metal. The preferred ways in which I accomplish these objects will be apparent from a reading of the subjoined specification in the light of the attached drawing, in which, Figure 1 is a central axial sectional view of my improved vehicle wheel.

Figure 1:
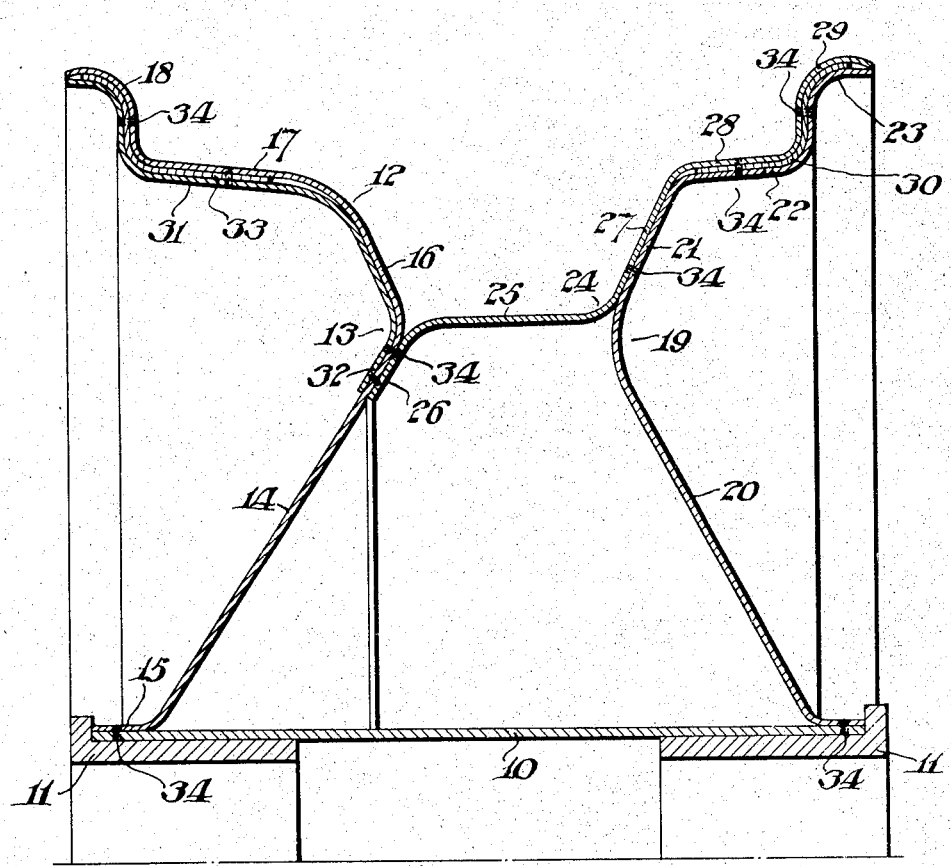
Figure 2:
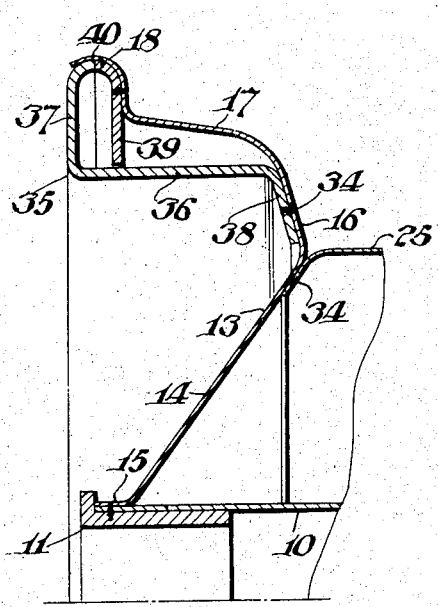
Figure 3:
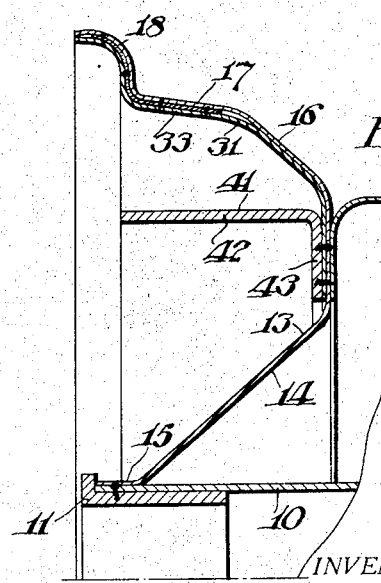

Figs. 2 and 3 are views similar to Figure 1, showing modifications pertaining to brake drums and methods of fastening them to the wheel.

In the preferred embodiment of Figure 1, the numeral 10 indicates a tubular hub of light gauge metal having two flanged sleeves 11 pressed into its opposite ends to receive the wheel bearings. The wheel rim 12 is preferably of the drop center non-demountable type, built up chiefly of angularly disposed sheet metal members, the members not only constituting the rim but the wheel body as well. In this way, advantage may be taken of the strength of certain metal structures, as well as the ease of fabrication of sheet metal stock.

Rim 12 is comprised chiefly of three main elements. One is a dished stamping 13 comprising a conical wheel body portion 14, flanged axially at 15 adjoining the hub 10, and a rim portion following substantially the normal contour of a drop-center rim, comprising a side wall 16, a tire bead seat 17, and a tire retaining flange 18. All of the elements of stamping 13 preferably lie on the same side of the central plane of the wheel, thus avoiding the necessity of a complicated stamping process The rim elements of member 13 are supplemented by an annular reinforcing member 31, which nests closely within the under side of member 13, and which continues inwardly to a zone 32, terminating in a conical flange through which it is secured to member 13. An additional reinforcing member 33 may be interposed between members 13 and 31 adjacent the outer rim portions.

At the opposite axial end of the wheel, a second dished stamping 19 is used, of essentially the same cross section as stamping 13, comprising a conical portion 20, dished oppositely to portion 14 of stamping 13, a side wall portion 21, a tire bead seat 22 and a tire retaining flange 23. Actually, these rim portions of member 19 are only supplementary, inasmuch as they lie on the under side of the actual rim, and serve to radially and axially support a third member 24 of sinuous cross section comprising a drop center portion 25 having an angularly inwardly extending flange 26 abutting the conical portion 14 of part 13 and attached thereto, a side wall portion 27, a tire bead seat 28, and a tire retaining flange 29. Elements 27, 28 and 29 of member 24 and elements 21, 22 and 23 of member 19 fit together in closely nested relationship, and are secured directly to each other except adjacent the tire bead seat and retaining flange, where an annular reinforcing strip 30 is interposed between them.

The numeral 34 represents the various locations where annular series of spot welds are employed to fasten the members together. Spot-welding has been determined upon as the most satisfactory means for securing the various sheet metal parts together, as it can be used equally well in any location, regardless of whether two, three or even more thicknesses of metal are to be united.

The wheel hereinbefore described comprises in effect a rim, a hub, and an interconnecting wheel member comprised of two oppositely conical discs. The strength of such an arrangement is at once apparent. The bracing action afforded by the two discs is in every case overly sufficient to meet any condition of torque, or of lateral or radial thrust. The rim portion per se is more than adequately strong by virtue of the nested relationship of the inner and outer elements, and the interposed reinforcing members.

In Figure 2, a modification is shown, in which the inner member 31 of Figure 1 has been supplanted by a brake drum member 35 of relatively heavier section stamped metal. This member is comprised by a central axially extending braking portion 36, having a radially outwardly extending flange 37 and an inwardly extending attaching flange 38 through which the drum 35 is attached to the side wall 16 of member 13. An annular stiffening flange 39 is spot welded to the outside of the tire retaining flange 18 of member 13, while the axial edge of this flange is turned outwardly. Drum member 35 may then be telescoped within member 13, the abutting flanges butt welded at 40, and the edge of portion 18 rolled down. Drum 35 is particularly designed for internal expanding brakes, the type now in widespread use. The annular channel section formed by the joinder of flange 37 and flange 39, braces and stiffens the tire retaining flange 18, and supports the tire bead seat 17 away from drum 35 so that heat generated by repeated or continuous braking actions will be dissipated, and will not deleteriously affect the tire.

In Figure 3, an angle-section stamped drum 41 is shown, comprising an axially extending braking portion 42 for internal or external brakes, and a radially extending flange 43, through which the drum is spot-welded to members 13 and 31, which members in this form are preferably joined in a vertical plane to allow room for brake mechanism with the drum 41.

In the forms shown, it will be noted that the tire bead seat formed by member 13 is of relatively greater axial extent than the tire bead seat on the other side of the central plane of the wheel, formed by members 19 and 24. This provision is to allow the brake drum and brake mechanism to be accommodated entirely with the wheel, thus improving the compactness and streamline appearance thereof.

The objects of my invention have been attained in full. By virtue of the fact that light stampings comprise the major elements of the wheel, I am able to meet the various requirements of different rim diameters and widths, as well as those of different hub and bearing arrangements by relatively easy changes in design. The composite nesting arrangement of the parts allows them to be made of extremely light gauge stock, thus effecting a considerable reduction and saving in cost and weight. The use of deep conical sections wherever possible makes for maximum strength with a minimum of weight. By the provision of a wider tire seating portion on the inner end of the rim portion, I am able to wholly encompass the brake drum and actuating means within the wheel. The rim construction is very simple, yet affords a favorable condition for welding the various component parts together.

The invention is susceptible of many modifications, and I do not therefore wish to be limited except by the scope of the appended claims.

I claim as my invention:

1. A vehicle wheel comprising axially spaced sheet metal body elements including hub and rim sections and central portions of oppositely sloping deep generally conical form, a frusto-conical member having a portion complemental to the rim section of one of said body elements and a portion complemental to the body section of said other body element, and a connecting portion defining the base of the rim and annular reinforcing members complemental to the rim sections.

2. A wheel comprising, in combination, a pair of similarly shaped sheet metal body elements forming opposite portions of a hub, and opposite sides of a rim, and an element connecting the said opposite sides of the rim and comprising a portion of one side of said rim, and a brake drum having head and flange portions respectively reinforcing the drop center and bead portions of said rim.

3. A vehicle wheel comprising axially spaced and aligned front and rear hub sleeve elements having remote-end annular flanges, front and rear thin gauge sheet metal members, each constituting a one piece stamping having a tire retaining flange, a tire seat, a drop center side wall, an annular portion of substantially frusto-conical form extending to one of said sleeves and an axial tubular portion nesting the adjacent sleeve against the adjacent sleeve flange, said members being axially spaced at the closest points by approximately the axial extent of the drop center wall of the rim, and a third thin gauge sheet metal single stamping having a tire retaining flange and a drop center side wall portion substantially conforming to the corresponding portions of one of said members and secured thereto, said third stamping also having a drop center bottom wall portion and an annular margin secured in conforming side surface relation to the other of said members.

4. A vehicle wheel comprising a hub structure, front and rear thin gauge sheet metal members, each constituting a one piece stamping having a drop center tire retaining flange, a tire seat, a drop center side wall, an annular portion of substantially frusto-conical form extending to said hub structure and a portion secured to said structure, said members being axially spaced from each other, and a third thin gauge sheet metal single stamping having a tire retaining flange and a drop center side wall substantially conforming to the corresponding portions of one of said members and secured thereto, said third stamping also having a drop center bottom wall and a portion secured to the other of said members.

5. A vehicle wheel comprising a hub structure, front and rear thin gauge sheet metal members, each having a tire retaining flange, a tire seat, a drop center side wall, a body of substantially frusto-conical form extending to and secured to said hub structure, said members being axially spaced from each other, and a third thin-gauge sheet metal member having a tire retaining flange and a side wall substantially conforming to the corresponding portions of one of said members, said third member also having a drop center bottom wall and a portion secured to the other of said members.

6. A vehicle wheel comprising a hub structure, front and rear thin gauge sheet metal members, each having a tire retaining flange, a tire seat, a drop center side wall, a body of substantially frusto-conical form extending and secured to said hub structure, said members being axially spaced from each other, a third thin-gauge sheet metal member having a tire retaining flange and a side wall substantially conforming to the corresponding portions of one of said members, said third member also having a drop center bottom wall and a portion secured to the other of said members, and sheet metal members secured one to each of said front and rear members and reinforcing the tire retaining flange thereof.

7. A vehicle wheel comprising front and rear sheet metal annuli having substantially frusto-conical wheel body portions sloping toward each other from an axially-extensive hub mounting portion to outer annular zones spaced axially by approximately the axial extent of the bottom wall of a drop center rim, a drop center rim wall joining said annuli at substantially said zones, drop center rim side walls, tire bases, retaining flanges, and a brake member secured to the wheel having the major portions thereof axially forwardly of the rear limits of the rear annuli and the rear retaining flange.

8. A vehicle wheel comprising front and rear sheet metal members, each having a frusto-conical main body portion, a drop center side wall portion, a tire seating portion and a tire flange portion, said members being axially spaced from each other, and a third sheet metal member overlapping one of said axially spaced members from adjacent the inner region of its drop center side wall portion to its outer periphery and reinforcing the same in said region, said third member also having a drop center bottom wall portion extending across from the last mentioned one of said axially spaced members to the other of said members and having further a portion overlapping said last named member and secured thereto.

ROBERT B. TEMPLE.